United States Patent [19]

Duggan et al.

[11] 4,316,328
[45] Feb. 23, 1982

[54] ANNULAR POWER TOOL

[75] Inventors: William R. Duggan, Sunapee; John M. Heath, Newbury, both of N.H.

[73] Assignee: Micro-Precision, Inc., Sunapee, N.H.

[21] Appl. No.: 86,289

[22] Filed: Oct. 19, 1979

[51] Int. Cl.³ .............................................. B27B 5/00
[52] U.S. Cl. ................................... 30/389; 51/170 PT
[58] Field of Search ............ 30/389; 51/170 PT, 73 R

[56] References Cited

U.S. PATENT DOCUMENTS

| Re. 27,716 | 8/1973 | Santilli | 30/389 |
|---|---|---|---|
| 1,395,101 | 10/1921 | Fite | 30/389 |
| 2,701,590 | 2/1955 | Barker | 30/389 |
| 3,135,304 | 6/1964 | Breer et al. | 30/389 |
| 3,221,783 | 12/1965 | Kaltenmark | 30/389 X |
| 3,438,410 | 4/1969 | Santilli | 30/389 |
| 3,930,310 | 1/1976 | Santilli | 30/389 |

Primary Examiner—Jimmy C. Peters
Attorney, Agent, or Firm—Cesari & McKenna

[57] ABSTRACT

Apparatus for rotating an annular or ring shape tool such as a saw blade or grinding wheel. The tool is rotated by a power driven drive roller acting on a face of the ting tool. A rigid arm supports guide rollers which in turn support the tool. The guide rollers have grooves that engage the inner periphery of the ring tool. The inner periphery of the ring tool may define a tapered tongue with a rounded edge that fits into complimentary shaped grooves in the guide rollers. Fixed and movable U-shape guards are provided to shield substantially all of the ring tool.

29 Claims, 9 Drawing Figures

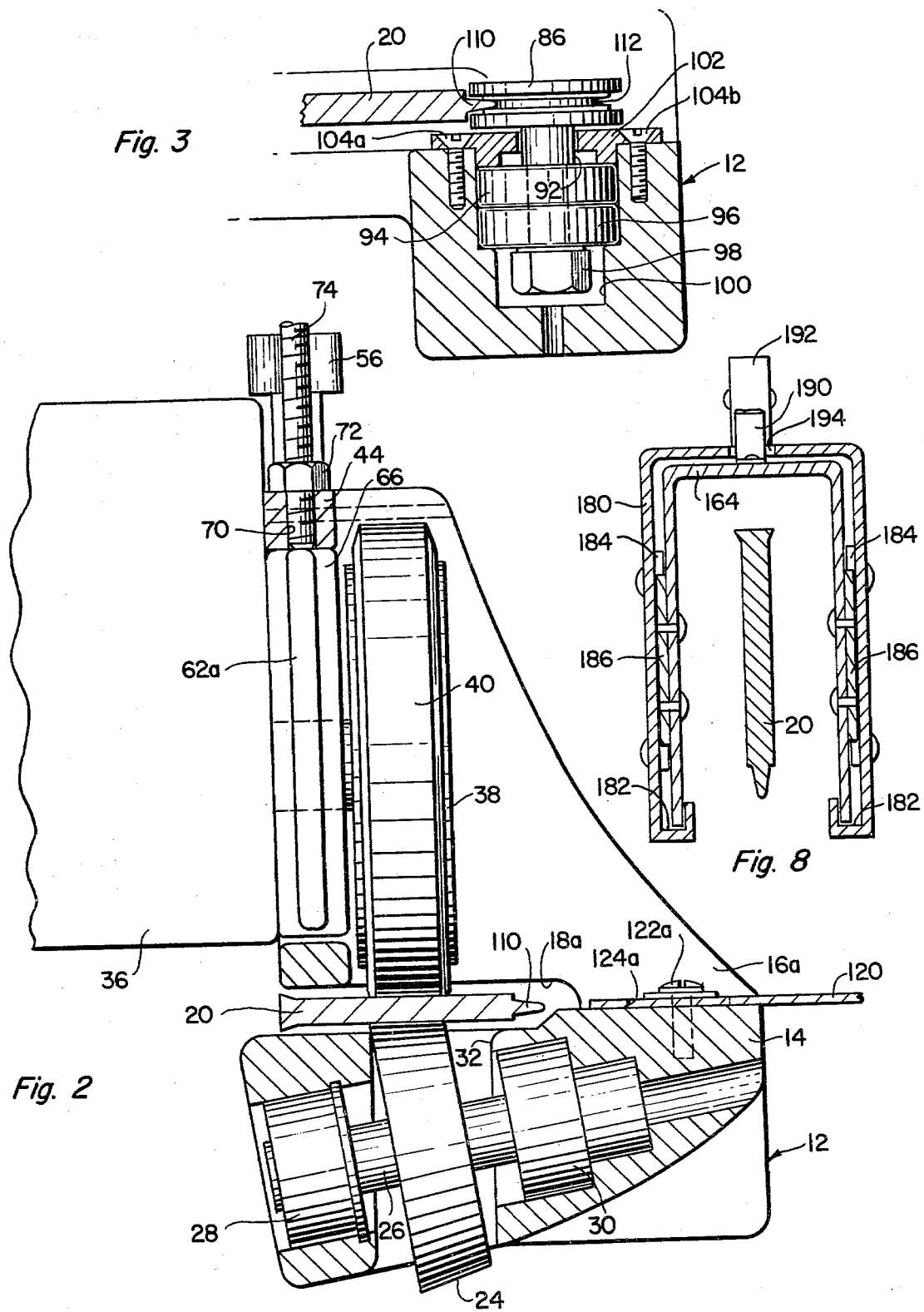

ANNULAR POWER TOOL

BACKGROUND OF THE INVENTION

This invention relates generally to power tools and, more particularly, to an improved power ring saw.

Power tools are known in which a power unit rotates an annularly shaped tool that is used to cut through or otherwise operate on workpieces. Ring saws are examples of such power tools. One such ring saw is disclosed in U.S. Pat. No. Re. 27,716 to E. Santilli.

In the ring saw disclosed in U.S. Pat. No. Re. 27,716, an annular saw blade is rotatively driven about a virtual axis normal to the plane of the blade by a conical drive roller acting against one of the blade faces. The drive roller is mounted on the shaft of a power unit (e.g., an electric motor), which shaft includes a helical groove that serves to urge the drive roller into frictional engagement with the blade face. The blade has an circular groove formed in one or both of its faces to accommodate conical guide rollers, each of which has a pair of rims formed around its outer surface that engage within the groove and against the inner peripheral edge of the blade. The rims prevent the blade from shifting radially as it rotates about its virtual axis.

Ring saws of the above type can be made in various sizes to perform a wide variety of jobs. The saws are particularly useful where depth of cut is critical because, unlike circular saws in which the saw blade is supported for rotation at its center, ring saws enable a depth of cut greater than the radius of the saw blade.

Ring saws of the type disclosed in the above Santilli patent have experienced various problems. When cutting through a workpiece, the saw blade, which is rotated at high speed, experiences considerable resistance that gives rise to reaction forces tending to shift the virtual axis of the blade radially. These radial forces are resisted primarily by the rims on the conical guide rollers which engage against the inner peripheral edge of the blade and within the circular guide groove. The forces increase the friction between the guide rollers and the blade, causing the blade to heat up and, with time, causing the guide groove in the blade and the rollers to wear. The wearing action gradually loosens the hold on the blade and gives rise to increased blade vibration. Such vibration and heat significantly shorten the useful life of the blade.

U.S. Pat. No. 3,930,310 to E. Santilli discloses an improved version of the ring saw disclosed in the above-cited U.S. Pat. No. Re. 27,716. The improvements are directed to various means to produce stability of the saw blade during cutting. For example, in the improved saw, the conical drive roller axis is canted relative to the blade so that it produces a force on the blade including both a tangential component for rotating the blade and a radial component for counteracting workpiece reaction forces tending to shift the blade radially. Means are also provided to vary the drive roller pressure on the blade, or the angle of the drive roller axis relative to the blade, so as to vary the radial force component in accordance with variations in the reaction forces. Stabilizing means of this type not only add to the overall cost of the saw, but also increase the number of components in the saw that are susceptible to failure. They are also at best only marginally effective in improving blade life.

Experience has shown that, even with the various stabilizing means disclosed in U.S. Pat. No. 3,930,310, ring saw blades used in ring saws of the type disclosed in the above two patents have useful lives only in the range of about 20 minutes to 5 hours of cutting operation. An inspection of the failed blades shows that most such blades fail because cracks develop in the gullets between the saw teeth on the outer periphery of the blade. The failed blades also have a noticeable concavity or "dishing" in the vicinity of the guide groove. Because of the action of the rimmed guide rollers on the blade, the inner annular portion of the blade, that is, the portion of the blade extending radially inwardly from the guide groove to the inner peripheral edge of the blade, is believed to heat up more than the outer peripheral portion of the blade during cutting. Because of this uneven heating, the inner blade portion tends to expand thermally to a greater extent than the outer blade portion. Additionally, the guide groove, which is formed by reducing the effective thickness of the blade, weakens the blade structurally. The combination of the uneven thermal expansion and weakening of the blade in the vicinity of the guide groove are believed to be primarily responsible for the blade cracking, dishing and ultimate failure.

OBJECTS OF THE INVENTION

A primary object of the present invention is to provide an improved annular power tool.

Another object of the invention is to provide an annular power tool that increases the useful lives of ring tools used therein.

Another object of the invention is to provide an annular power tool having improved means for supporting a ring tool and for preventing radial and axial displacement of the tool during its rotation and operation on a workpiece.

Another object of the invention is to provide an annular power tool having improved tool supporting means which greatly alleviate the heat, wear and vibration problems heretofore experienced with conventional annular power tools.

Another object of the invention is to provide an annular power tool having improved tool supporting means of the type described above which effectively hold and stabilize the ring tool without the use of or need for a guide groove in the ring tool face.

Another object of the invention is to provide an improved annular power tool of the type described that is relatively simple and sturdy in construction and relatively economical to manufacture.

Still another object of the invention is to provide an improved groove-less ring tool for use in an annular power tool of the type described above.

Other objects of the invention will, in part, be obvious and will, in part, appear hereinafter to those skilled in the art.

BRIEF DESCRIPTION OF THE INVENTION

In accordance with an illustrative embodiment of the invention, an annular power tool comprises a main frame that includes means for supporting a ring tool and a power unit used for rotating the ring tool. The main frame includes a base portion and a pair of power unit support members that project outwardly at spaced positions from the base portion. A slot is provided at the foot of each support member above the base portion in which the ring tool is positioned. The ring tool, which may comprise a saw blade, grinding wheel or other such tool, has the shape of a flat annulus with two flat opposed faces, an outer peripheral edge including working means (e.g., saw teeth) and an inner peripheral edge. The ring tool is inserted within the slots in the support members, inner edge first. A conical idler roller is mounted within the base portion of the main frame and is exposed through an opening therein between the support members. The idler roller bears against one of the faces of the ring tool.

The power unit, which may comprise a hydraulic motor, electric motor, gasoline engine or any other such unit, includes a drive shaft to which a cylindrical drive roller is attached. The power unit fits between the support members so that the drive roller bears against the opposite face of the ring tool directly opposite to the area engaged by the idler roller. The ring tool is thus sandwiched between the idler roller and the drive roller. The power unit is secured in position by a locking bar that extends between the two support members. The locking bar includes a first end that is pivotally attached to one of the support members and a second end that may be removably attached to the other support member. When the second end of the locking bar is free, the bar may be pivoted about its first end to permit the power unit to be inserted in the space above the ring tool and between the two support members. The bar may then be pivoted back over the power unit and the second end of the bar attached to the support member to lock the power unit in place.

The drive roller, when rotated by the power unit, frictionally engages against the face of the ring tool opposite to that engaged by the idler roller, causing the ring tool to rotate about a virtual axis normal to the plane of the tool and through the tool center. The force exerted by the drive roller on the ring tool is controlled by a torque screw that passes through the locking bar and presses the power unit and drive roller downwardly against the ring tool. As a safety factor, the ring tool should slip relative to the drive roller and stop turning when excessive resistance is encountered during cutting through a workpiece. The point of slippage is determined by the force exerted by the drive roller on the ring tool face. The torque screw assures that the same limited drive roller force is exerted on the ring tool irrespective of the operator or cutting conditions.

The main frame includes improved means for supporting the ring tool and restraining it from shifting radially and axially during rotation. These supporting means include a pair of guide rollers mounted at spaced positions to the base portion of the main frame, and a nose roller assembly that includes a nose roller attached to the projecting end of an elongated, flat, rigid arm that extends outwardly from the main frame across the space defined by the ring tool annulus. The nose roller assembly and arm are thin enough to pass through an opening cut by the ring tool. Each of the two guide rollers and nose roller is positioned in the plane of the ring tool and, together, they define three rigid, angularly spaced points of engagement with the inner peripheral edge of the tool. The two guide rollers and nose roller thus prevent the ring tool from shifting radially in any direction away from its virtual axis.

Axial displacement of the ring tool is prevented by having the two guide rollers and nose roller assembly overlap the side faces of the ring tool. More specifically, each of the guide rollers includes a peripheral groove into which the inner peripheral edge of the ring tool fits so that the inner edge portion of the tool is overlapped at its upper and lower face by the roller. The nose roller assembly comprises a hub fixed to and sandwiched between a pair of spaced side plates and an annular wheel that is free to rotate about the hub between the two side plates. The wheel, like the guide rollers, include a peripheral groove into which the inner peripheral edge of the ring tool fits so that the wheel overlaps the upper and lower faces of the tool.

In the preferred embodiment of the invention, the inner peripheral edge of the ring tool is formed as a tapered tongue that is of slightly reduced thickness compared to the remainder of the tool. The peripheral groove in each of the two guide roller and nose roller wheel has a complementary shape and size to receive the tapered tongue of the tool. The side plates of the nose roller assembly are spaced from one another by an amount such that the outside faces of the side plates are flush with (i.e., in the same plane as) the side faces of the tool.

This improved ring tool supporting arrangement not only effectively restrains the tool radially and axially, but also enables the tool to run cooler and with less friction, and thus produces less wear on the tool and rollers and less tool vibration. Also, since the arrangement eliminates the circular guide groove required in conventional ring tools, it does not create dishing of the tool.

The nose roller arm is preferably secured to the main frame by a pair of bolts that pass through elongated openings in the arm. When the bolts are loosened, the arm and nose roller may be moved from the ring tool to permit removal of the tool, for example, when the tool is to be changed. The elongated openings also permit the effective length and attitude of the arm to be adjusted to accommodate variations in the size of the ring tool.

The annular power tool of the invention is also preferably equipped with a guard assembly that attaches to the main frame and that shields either part or substantially all of the outer peripheral edge of the ring tool.

BRIEF DESCRIPTION OF THE DRAWINGS

The foregoing and other objects, features and advantages of the invention will be better understood from the following detailed description taken in conjunction with the accompanying drawing in which:

FIG. 2 is an enlarged view, partly in section, showing the main frame, power unit, drive roller and idle roller in the ring saw of FIG. 1;

FIG. 3 is a enlarged view, partly in section, showing one of the two guide rollers in the ring saw of FIG. 1;

FIG. 8 is a cross-section view of second and third portions of the blade guard assembly shown in FIG. 7.

DETAILED DESCRIPTION OF AN ILLUSTRATIVE EMBODIMENT

Figure 1:
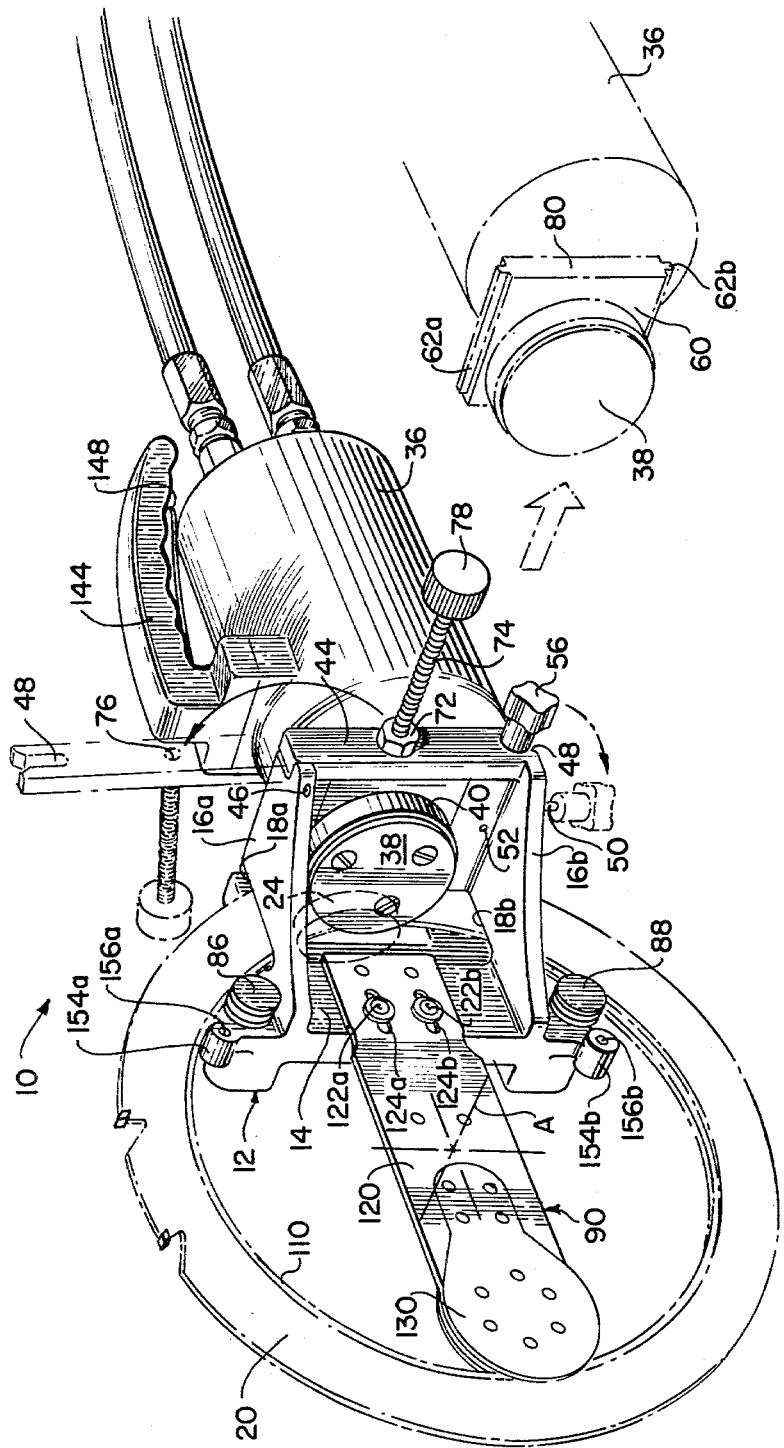
FIG. 1 is a perspective view of an improved annular power tool embodied in accordance with the invention in the form of a ring saw.

Referring now specifically to the drawing, and initially to FIG. 1 thereof, there is shown a ring saw 10 embodied in accordance with the invention. The ring saw 10 includes a main frame 12 that comprises a base portion 14 and a pair of power unit support members 16a and 16b that project outwardly at spaced positions from the base portion 14. The support members 16a and 16b have a generally triangular shape and are integrally connected to the base portion 14 at their forward ends. Slots 18a and 18b are formed at the base of each support member 16a and 16b which open toward the rear of the main frame. A ring tool, shown as saw blade 20 in FIG. 1, is positioned in the slots 18a and 18b.

A conical idler roller 24 is mounted within the base portion 14 of the main frame 12 so as to bear against one of the side faces of the saw blade 20. The idler roller 24 is shown in more detail in FIG. 2. As seen in FIG. 2, the idler roller 24 is fixed to a shaft 26 which is mounted for rotation within a pair of bearings 28 and 30 on opposite sides of the roller 24. The roller 24 projects upwardly through an opening 32 in the base portion 14. The shaft 26 is oriented at an angle so that the large and small diameter portions of the roller 24 experience the same angular rotation with the radial portions of the blade 20 contacted thereby.

Referring again to FIG. 1, a power unit, illustratively in the form of a hydraulic motor 36, is disposed between the side support members 16a and 16b. The shaft of the motor 36 is fixed to a cylindrical drive roller 38 that is adapted to bear against the side face of the blade 20 directly opposite to the area that is engaged by the idler roller 24. The drive roller 38 is equipped with a rim 40 of rubber that improves the frictional grip on the side face of the blade 20. Rubber is used in lieu of asbestos, as in conventional ring saw drive rollers, for environmental safety reasons.

Figure 4:
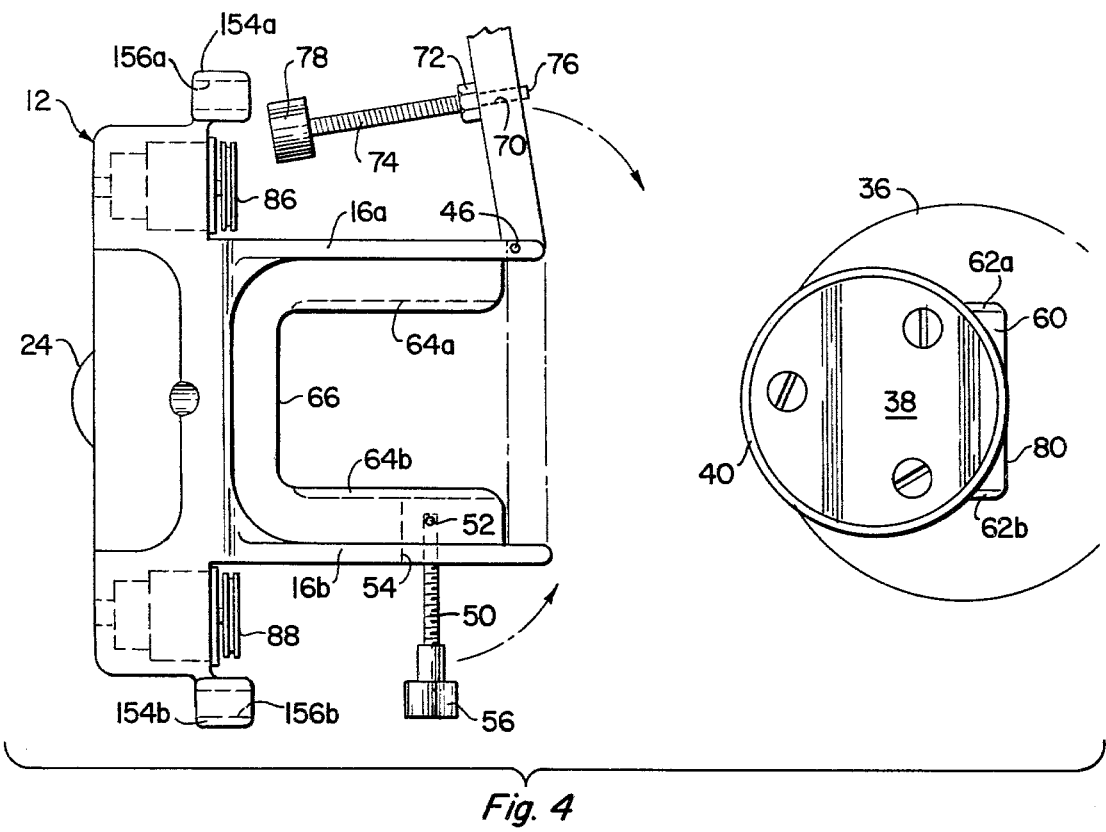
FIG. 4 is a front view of the main frame and power unit in the ring saw of FIG. 1 which shows the power unit removed from the main frame.

The motor 36 is held in position between the support members 16a and 16b by a pivoted locking bar 44. One end of the bar 44 is pivotally attached to the projecting end of side member 16a, as by pin 46. The opposite end of the bar 44 has a U-shaped notch 48 formed therein. A swing bolt 50 is pivotally attached to the support member 16b by a pin 52. As best seen in FIG. 4, the swing bolt 50 can be pivoted about the pin 52 into and out of a channel 54 formed in the outside surface of the support member 16b. A cap nut 56 engages and turns within the threads of the swing bolt 50.

When the swing bolt 50 and cap nut 56 are pivoted out of the channel 54 and the locking bar 44 is pivoted away from the side member 16b, as shown in phantom in FIG. 1, the motor 36 can be slid into or out of the space between the side members 16a and 16b. As best seen in FIGS. 1 and 4, the motor 36 includes a rectangular plate 60 secured to the forward face of the motor housing behind the drive roller 38. The plate 60 has a pair of reduced thickness rims 62a and 62b formed along its opposite edges. A complementary pair of grooves 64a and 64b (FIG. 4) are formed along the inside surface of the support members 16a and 16b. The plate 60 is dimensioned to fit within the space 66 (FIG. 4) defined by the inside of the support members 16a and 16b, with the rims 62a and 62b engaged within the grooves 64a and 64b, respectively. The rims 62a and 62b and grooves 64a and 64b thus prevent the motor 36 from moving forwardly or rearwardly relative to the support members 16a and 16b.

When the motor 36 is fully in position between the support members 16a and 16b, the locking bar 44 is pivoted back over the top of the plate 60 until the end thereof with the notch 48 contacts the projecting end of the support member 16b. The swing bolt 50 is pivoted up into the channel 54 and into the notch 48. The cap nut 56 is then tightened down on the bolt 50 and against the locking bar 44 to secure the bar 44 in place. The bar 44 thus prevents the motor 36 from moving outwardly away from the blade 20.

A hole 70 (FIG. 4) is formed through the center of the bar 44 and a nut 72 is rotatively secured to the outside surface thereof over the hole 70. A torque screw 74 passes through the nut 72 and hole 70 so that its end 76 projects slightly below the bar 44. When the locking bar 44 is secured in place across the support members 16a and 16b, as shown in FIG. 1, the torque screw 74 is turned to tighten its end 76 against an end face 80 on the motor plate 60. The torque screw 74 thus presses the motor 36 and drive roller 38 downwardly against the saw blade 20. The torque screw 74 slips after a predetermined turning torque is applied thereto. The torque screw 74 may then be locked in place by tightening nut 72. The torque screw 74 thus prevents overtightening of the drive roller 38 against the blade 20 to insure blade slippage relative to the roller 38 when excessive cutting resistance is experienced by the blade 20. The torque screw 74 also insures that a uniform pressure is exerted by the drive roller 38 against the blade 20 each time the blade 20 is changed or readjusted for drive wheel wear.

The saw blade 20 is supported for rotation about a virtual axis A (FIG. 1) normal to the plane of the blade and at the blade center by a system of rollers comprising a pair of guide rollers 86 and 88 and a nose roller assembly 90. The guide rollers 86 and 88 are mounted to the main frame 12 just to the outside of the support members 16a and 16b, respectively. The guide roller 86 is shown in more detail in FIG. 3.

As shown in FIG. 3, the guide roller 86 is fixed to one end of a shaft 92 which is free to rotate within bearings 94 and 96. The other end of the shaft 92 is threaded so as to receive a nut 98 which prevents the shaft 92 from slipping out of the bearings 94 and 96. The bearings 94 and 96, shaft 92 and nut 98 are positioned within a counterbored opening 100 in the main frame 12 and held in position in the opening 100 by an apertured cap 102 which is secured to the main frame by a pair of screws 104a and 104b. The roller 86 thus projects above the main frame 12 into the same plane as that of the blade 20, and is free to rotate with the blade 20 about the axis of the roller shaft 92, which is parallel to the virtual axis of the blade 20.

As indicated in FIG. 3, the inner peripheral edge of the blade 20 is formed as a tapered tongue 110, the end of which is slightly rounded. A complementary groove 112 is formed around the periphery of the guide roller 86 in which the tongue 110 fits. The roller 86 thus overlaps the upper and lower edges of the tongue 110 and restrains the blade 20 from shifting upwardly and downwardly along the turning axis of the roller 86. The guide roller 88 is illustratively identical to the guide roller 86 shown in FIG. 3.

The nose roller assembly 90 comprises a relatively thin, rigid, elongated arm 120 that removably attaches to the base portion 14 of the main frame 12 and that projects outwardly therefrom across the space defined by the inner peripheral edge of the blade 20. A replaceable nose roller 130 attaches to the projecting end of the arm 120. The arm 120 is attached to the main frame 12 by a pair of bolts 122a and 122b that pass through elongated openings 124a and 124b in the arm 120. The bolts 122a and 122b screw into threaded openings (not shown) in the base portion 14. When the bolts 122a and 122b are loosened, the elongated slots 124a and 124b enable the arm 120 to be retracted rearwardly to permit removal of the blade 20 from the slots 18a and 18b. The openings 124a and 124b also enable the effective length and attitude of the arm 120 to be adjusted to insure a proper fit to the blade 20. The ring saw 10 can be provided with more than one arm 120, each of a different length, which can be used interchangeably in the saw 10 to accommodate blades 20 of different diameter. Alternatively, a single arm 120 can be provided which accommodates blades of different outer diameter provided the inner diameter of the blades is essentially the same.

Figure 5:
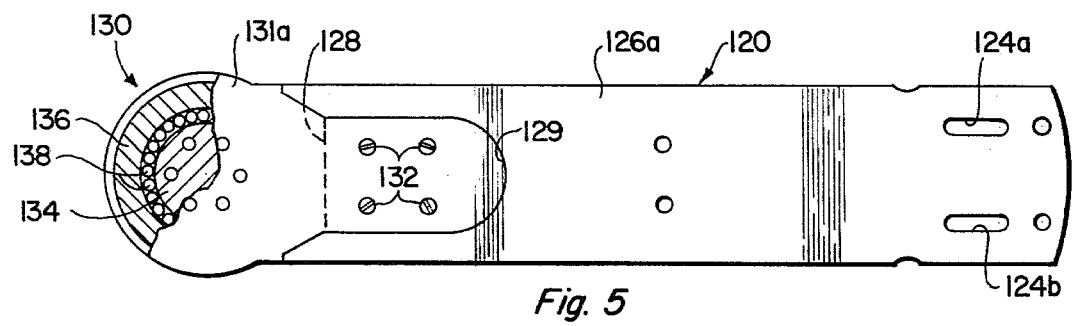
FIG. 5 is a side view, partly in section, of the nose roller assembly in the ring saw of FIG. 1.
Figure 6:
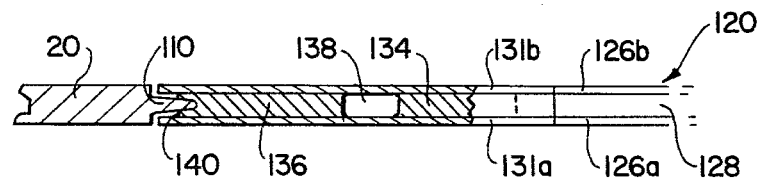
FIG. 6 is an enlarged edge view, partly in section, of the tip, or free, end of the nose roller assembly of FIG. 5.

The nose roller assembly 90 is shown in more detail in FIGS. 5 and 6 of the drawing. The arm 120 comprises a pair of side plates 126a and 126b fixed to opposite sides of a center spacer 128. As indicated in FIG. 5, the projecting ends of the side plates 126a and 126b are cut-out, as shown at 129, to expose the center space 128. The nose roller 130 comprises a pair of side members 131a and 131b having tab-like extensions that fit in the cutouts 129 and are removably secured over opposite sides of the center spacer 128, as by rivets 132. A circular hub 134 is fixed between the side members 131a and 131b. An annular wheel 136 is disposed about the hub 134 and is free to rotate about the hub 134 on a plurality of disc-shaped bearings 138.

As shown in FIG. 6, the outer peripheral edge of the nose roller wheel 134 is provided with a groove 140 which, like the peripheral grooves in the guide rollers 86 and 88, receives and overlaps the blade tongue 110 and prevents the blade 20 from shifting axially. The outside faces of the side members 131a and 131b and of the side plates 126a and 126b are preferably in the same plane as the side faces of the blade 20. The overall thickness of the arm 120 and nose roller 130 are such that they fit through a cut in a workpiece made of blade 20.

The nose roller assembly 90 and two guide rollers 86 and 88 define three angularly spaced points of engagement with the inner peripheral edge of the blade 20 which enable the blade 20 to rotate freely about its virtual axis A, but which prevent the blade 20 from shifting radially and axially in any direction during such rotation. Rotation of the blade 20 is achieved by activating the motor 36 which rotates the drive roller 38 which, in turn, through frictional engagement with the side face of the blade 20, rotates the blade 20 about its virtual axis A. The drive roller 38 acts like a clutch in that, when excessive resistance is encountered during the cutting, the roller 38 slips relative to the blade 20 and the blade 20 stops rotating. When not cutting, it is also desirable to prevent the blade 20 from exceeding a safe operating speed. This may be accomplished by incorporating a speed limiting device in the motor 36. We have found hydraulic and air motors particularly desirable in this respect, as they inherently stall when safe operating speeds are exceeded.

The motor is provided with a handle 144 and a handle mounted trigger 148 which is used to activate the motor 36. A second handle (not shown) may be provided at a suitable position on the motor 36 for holding the ring saw 10 with two hands in the event that the size and weight of the saw 10 warrant such a two hand hold.

Figure 7:
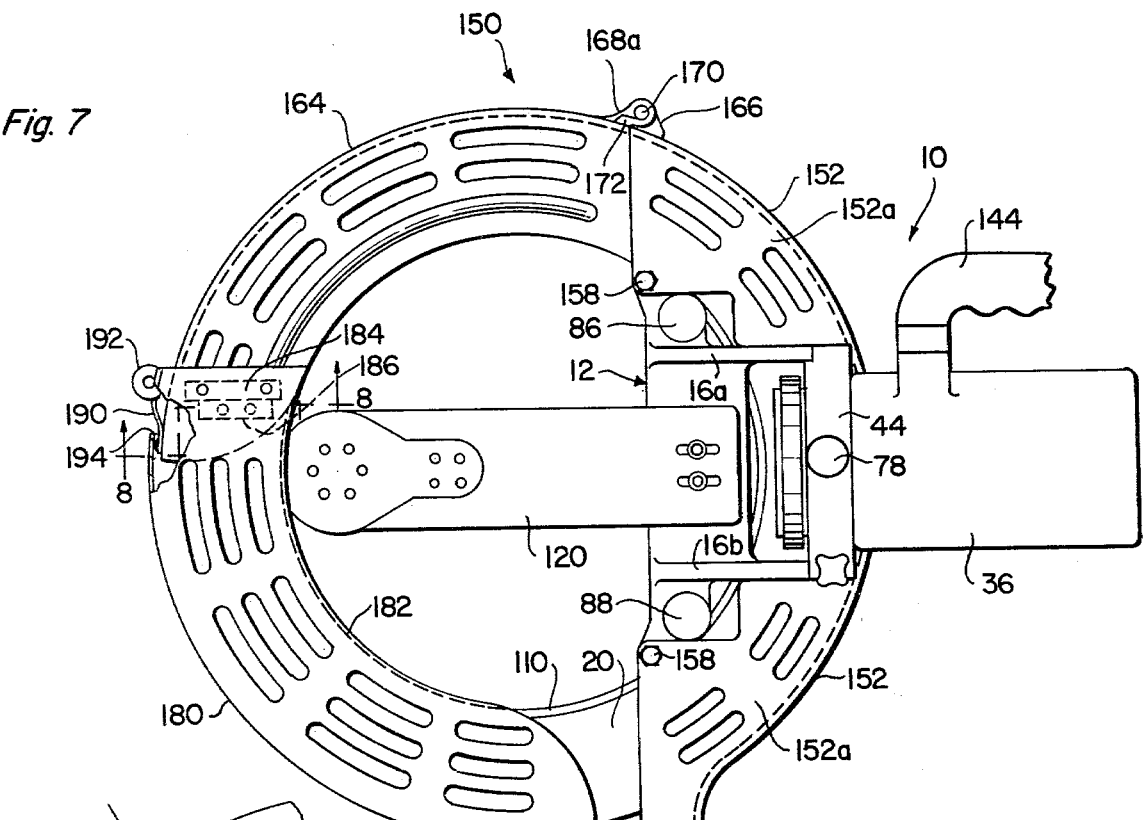
FIG. 7 is a side view of the ring saw of FIG. 1 showing a blade guard assembly mounted to the saw.
Figure 9:
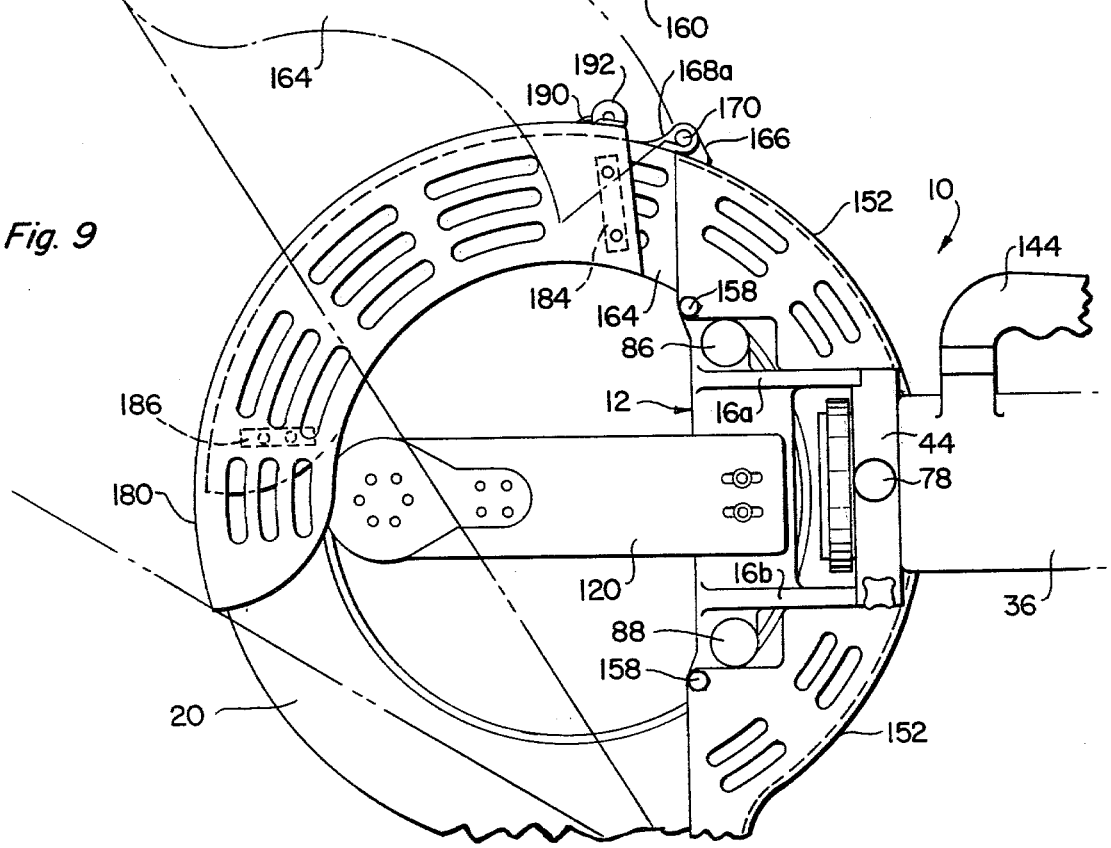
FIG. 9 is a side view similar to the view of FIG. 7 showing a third guard portion in a retracted position.

FIGS. 7, 8, and 9 of the drawing illustrate a blade guard assembly 150 which may be mounted to the ring saw 10 to shield the blade 20. The blade guard assembly 150 comprises a first guard member 152 which is arcuately shaped and has U-shaped cross-section and which mounts to the main frame 12. As seen in FIGS. 1 and 4, the main frame 12 includes a pair of ears 154a and 154b that project outwardly in the vicinity of the two guide rollers 86 and 88. Each of the ears 154a and 154b includes an opening 156a and 156b respectively. One side 152a of the first guard member 152, (i.e., the side facing the viewer in FIG. 7) is cut out so that the member 152 may be slipped over the blade 20 from the rear of the saw 10 and secured to the ears 154a and 154b by a pair of bolts 158. The first guard member 152 thus covers the rear portion of the blade 20 which is closest to the operator. The lower end of the member 152 is formed as a closed, curved bumper 16 which may be used as a support and pivot point by the operator during cutting through a workpiece.

If a greater amount of blade coverage is desired, the blade guard assembly 150 may include a second guard member 164 that pivotally attaches to the first guard member 152. The second guard member 164, like the first guard member 15, is arcuately shaped and has a U-shaped cross-section. As seen in FIG. 7, the upper end of the member 152 has an upstanding apertured ear 166, while the upper rear end of the member 164 includes a complimentary pair of apertured ears 168a and 168b that straddle the ear 166 (the ear 168b is hidden from view in FIG. 7). A bolt 170 passes through the aligned apertures in the ears 166, 168a and 168b to pivotally attach the member 164 to the member 152. The member 164 is free to pivot about the bolt 170 away from the blade 20, as shown in phantom in FIG. 9. Preferably, the member 164 is spring-loaded downwardly over the blade 20, as by coil spring 172 which is secured by the bolt 170. In its lowest position, the rear end of the member 164 bears against the upper end member 152 to keep the member 164 properly spaced from the blade 20.

If it is desired to shield substantially all of the blade 20, the blade guard assembly 150 may include a third guard member 180 that attaches to the second guard member 164. The third member 180 also is arcuately shaped and has a U-shaped cross-section, but is of slightly larger cross-section than the second guard member 164 so that the member 180 fits over the member 164. As indicated in the cross-sectional view of FIG. 8, the lower edges of the member 180 are bent inwardly and then upwardly to define channels 182 that envelope the lower edges of the member 164. The member 180 is thus retractable by sliding it in a telescoping manner upwardly and rearwardly over the member 164. Stop 184 on the inside surface of the member 180 and stop 186 on the outside surface of the member 164 cooperate to limit the extension of the member 180.

Preferably, the third guard member 180 is spring-biased into its extended position. This may be accomplished using a constant force, flat spring 190 which is wound in a casing 192 secured to the outside edge of the member 180, as shown in FIGS. 7 and 8. The free end of the spring 190 is passed through a aperture 194 in the outer edge of the member 180 and secured to the outer edge of the member 164. As the member 180 is retracted, the spring 190 unwinds from the casing 192 and exerts a constant force tending to return the member 180 to its fully extended position. FIG. 9 shows the member 180 fully retracted over the member 164 to expose the lower part of the blade 20, as when cutting through a workpiece.

Preferably, each of the guard members 152, 164 and 180 is perforated along its sides and outer edge to provide means for the escape of saw dust during cutting.

The foregoing detailed description of ring saw 10 is intended to illustrate rather than limit the invention. It should be understood that numerous modifications may be made to the particularly described embodiment by those skilled in the art without departing from the scope of the invention, as defined by the appended claims.

For example, the invention is not limited to ring saws, but is equally applicable to other devices having power driven annular tools, such as grinders, polishers, and the like. The power unit that drives the annular tool may also comprise any suitable such unit, including a gasoline engine, electric motor, air motor or the like. Also, while the nose roller assembly 90 has been shown as including only one arm 120 and one nose roller 130, the assembly may actually include a plurality of arms and nose rollers which extend outwardly at different angles and which contact the inner edge of the annular tool at different points. Such a multiple arm nose roller assembly may be particularly useful in devices having very large diameter annular tools. Furthermore, while a portable, hand-held device has been described above, it should be noted that the invention is also applicable to stationary, frame supported devices. It is thus the object of the appended claims to cover these and other modifications as come within the true scope of the invention.

What we claim as new and desire to secure by Letters Patent of the United States is:

1. In apparatus of the type including an annular tool that is driven to rotate about a virtual axis by a drive roller which acts upon a face of the tool, improved means for supporting the tool for rotation about its virtual axis comprising:
   a. a main frame;
   b. first and second guide rollers mounted at spaced positions to said main frame for rotation about an axis parallel to the virtual axis of the tool, said first and second guide rollers being adapted to engage the inner peripheral edge of the tool; and
   c. a nose roller assembly including
      i. a rigid arm having a first end mounted to said main frame and a second end that extends outwardly from said main frame within the space defined by the inner peripheral edge of the tool, and
      ii. a nose roller secured to the second end of said arm for engaging the inner peripheral edge of the tool at a point that is angularly spaced from the points of engagement of the tool by said first and second guide rollers.

2. The apparatus of claim 1 in which each of said guide rollers includes a peripheral groove into which the inner peripheral edge of the tool fits so that said guide rollers restrain movement of the tool along its virtual axis.

3. The apparatus of claim 2 in which said nose roller includes a peripheral groove into which the inner peripheral edge of the tool so that said nose roller also restrains movement of the tool along its virtual axis.

4. The apparatus of claim 1 in which the first end of said arm is removably mounted to said main frame.

5. The apparatus of claim 4 in which the first end of said arm includes a pair of elongated openings and in which the first end of said arm is removably mounted to said main frame by means that pass through said openings into said main frame, said elongated openings enabling the effective length of said arm to be adjusted.

6. The apparatus of claim 1 in which said nose roller is removably secured to the second end of said arm.

7. The apparatus of claim 1 further including a power unit for rotating the drive roller.

8. The apparatus of claim 7 in which said main frame includes a base portion and a pair of spaced support members projecting outwardly from said base position, said power unit being supported by said support members.

9. The apparatus of claim 8 in which each of said support members defines a slot at its base above said base portion into which the tool fits so that the drive roller may bear against one of the two opposed faces of the tool.

10. The apparatus of claim 9 in which said base portion defines an opening and further includes a conical idler roller mounted therein, the edge of said idler roller extending through said base portion opening so as to bear against the other of the two opposed faces of the tool at a point directly opposite to that engaged by the drive roller.

11. The apparatus of claim 7 in which the drive roller comprises a cylindrical roller that is rotated by said power unit about an axis parallel to the two opposed faces of the tool.

12. The apparatus of claim 11 in which the drive roller includes a rim of rubber material that improves the frictional grip of the drive roller on the face of the tool.

13. The apparatus of claim 8 in which said main frame further includes a locking bar for holding said power unit between said support members.

14. The apparatus of claim 13 in which said locking bar includes a first end that is pivotally attached to one of said side members and a second end that is removably securable to the other of said side members, whereby the second end of said locking bar may be released and said locking bar pivoted about its first end to permit removal of said power unit from said side members.

15. The apparatus of claim 14 in which the second end of said locking bar is removably securable to the other of said side members by a swing bolt that is pivotally secured to the other of said side members.

16. The apparatus of claim 13 in which said locking bar further includes a threaded opening and a screw that is tightenable through said threaded opening to bear against said power unit and to press the drive roller against the face of the tool.

17. The apparatus of claim 16 in which said locking bar screw comprises a torque screw which limits the pressure applied by the drive roller against the face of the tool.

18. The apparatus of claim 3 in which the opposed faces of the tool are planar and in which the inner peripheral edge of the tool defines a tapered tongue that fits within the peripheral grooves in each of said guide rollers and said nose roller.

19. The apparatus of claim 18 in which the edge of said tapered tongue is rounded and in which the bottom of the peripheral grooves in said guide rollers and of said nose roller have a complimentary rounded shape to conform to the shape of the tongue edge.

20. The apparatus of claim 18 in which said arm and said nose roller side members have an overall thickness substantially equal to or less than the overall thickness of the tool.

21. The apparatus of claim 1 further including a first tool guard member having an arcuate shape and U-shaped cross-section secured to said main frame for shielding a portion of the outer peripheral edge of the tool.

22. The apparatus of claim 21 further including a second tool guard member having an arcuate shape and U-shaped cross-section pivotally attached to said first guard member for shielding a second further portion of the outer peripheral edge of the tool, said second tool guard member being pivotal about its pivotal attachment to expose the second portion of the tool.

23. The apparatus of claim 22 further including means for biasing said second tool guard member into a position to shield the second portion of the tool.

24. The apparatus of claim 22 further including a third tool guard member having an arcuate shape and U-shaped cross-section attached to said second tool guard member for shielding a third, still further portion of the outer peripheral edge of the tool, said third tool guard member being retractable toward said second tool guard member to expose the third portion of the tool.

25. The apparatus of claim 24 further including means for biasing said third tool guard member away from said second tool guard member and into an extended position to shield the third portion of the tool.

26. The apparatus of claim 1 in which the tool comprises a saw blade having working means at its outer peripheral edge.

27. The apparatus of claim 7 in which said power unit includes a handle and trigger means for activating said power unit to rotate the drive roller.

28. The apparatus of claim 7 in which said power unit comprises a hydraulic motor.

29. An improved annular tool of the type that is adapted to be driven for rotation about a virtual axis by a drive roller which acts upon a face of the tool, said improved annular tool comprising:
   a. an outer peripheral edge including working means;
   b. an inner peripheral edge;
   c. two opposed, planar faces extending between said outer peripheral edge of said tool and said inner peripheral edge of said tool, the drive roller being adapted to act against one of said planar faces; and
   d. a tapered guide tongue formed at said inner peripheral edge of said tool;
   e. the free end of said tapered guide tongue being rounded.

* * * * *